(12) United States Patent
Martini et al.

(10) Patent No.: US 9,945,467 B2
(45) Date of Patent: Apr. 17, 2018

(54) SUPPORTING ASSEMBLY FOR A LIGHTWEIGHT DIFFERENTIAL

(71) Applicant: Schaeffler Technologies AG & Co. KG, Herzogenaurach (DE)

(72) Inventors: Harald Martini, Herzogenaurach (DE); Thorsten Biermann, Wachenroth (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 95 days.

(21) Appl. No.: 15/034,088

(22) PCT Filed: Oct. 14, 2014

(86) PCT No.: PCT/DE2014/200554
§ 371 (c)(1),
(2) Date: May 3, 2016

(87) PCT Pub. No.: WO2015/067263
PCT Pub. Date: May 14, 2015

(65) Prior Publication Data
US 2016/0265642 A1 Sep. 15, 2016

(30) Foreign Application Priority Data

Nov. 7, 2013 (DE) .......... 10 2013 222 621

(51) Int. Cl.
*F16H 48/40* (2012.01)
*F16H 48/10* (2012.01)
(Continued)

(52) U.S. Cl.
CPC ............ *F16H 48/40* (2013.01); *F16H 48/10* (2013.01); *F16H 48/11* (2013.01);
(Continued)

(58) Field of Classification Search
CPC ............ F16H 2048/405; F16H 48/11; F16H 2048/385
See application file for complete search history.

(56) References Cited

U.S. PATENT DOCUMENTS 1,657,510 A * 1/1928 Leipert .............. F16H 48/08
475/222
1,937,950 A * 12/1933 Ford ............... F16H 48/08
464/178
(Continued)

FOREIGN PATENT DOCUMENTS

CN 1699794 11/2005
CN 1026067 7/2012
(Continued)

*Primary Examiner* — Sherry L Estremsky
(74) *Attorney, Agent, or Firm* — Adam R. Southworth

(57) ABSTRACT

A differential gearing for a motor vehicle, comprising a drive gear, by means of which torque can be introduced into the gearing, a first output element and a second output element, by means of which the torque can be output from the gearing, a differential housing attached to the drive gear in a rotationally fixed manner, wherein the drive gear and the differential housing together form a differential cage for transmitting torque from the drive gear to the first output element, wherein the first output element is arranged in such a way that the first output element can be rotated in relation to the differential cage, and a first rolling-element bearing for supporting the differential hosing on a housing, wherein a bearing shell of a second rolling-element bearing is directly attached to the drive gear in a rotationally fixed manner.

16 Claims, 3 Drawing Sheets

(51) Int. Cl.
*F16H 48/11* (2012.01)
*F16H 48/38* (2012.01)

(52) U.S. Cl.
CPC .. *F16H 2048/106* (2013.01); *F16H 2048/385* (2013.01); *F16H 2048/405* (2013.01)

(56) References Cited

U.S. PATENT DOCUMENTS

| | | | | |
|---|---|---|---|---|
| 2,037,961 | A | * | 4/1936 | Boden ................ F16C 19/54 384/571 |
| 3,814,222 | A | * | 6/1974 | Koivunen ............ B60K 17/16 188/264 P |
| 7,393,141 | B2 | * | 7/2008 | Fahrni, Jr. ............ F16C 19/364 384/537 |
| 8,221,277 | B2 | * | 7/2012 | Vogel .................. F16H 48/08 475/230 |
| 8,747,275 | B2 | * | 6/2014 | Shioiri ................ F16H 48/08 29/893.2 |
| 9,718,354 | B2 | * | 8/2017 | Lee ..................... B60K 17/35 |
| 2006/0160652 | A1 | | 7/2006 | Maki et al. |
| 2009/0258750 | A1 | * | 10/2009 | Ziech .................. F16H 48/08 475/230 |
| 2017/0284524 | A1 | * | 10/2017 | Lee ..................... F16H 48/10 |

FOREIGN PATENT DOCUMENTS

| | | | |
|---|---|---|---|
| DE | 10309602 A1 | * 9/2004 | ............ F16H 48/08 |
| DE | 102011085119 B3 | 2/2013 | |
| DE | 102012206443 A1 | 10/2013 | |
| FR | 383235 A1 | 2/1908 | |
| GB | 770680 A | * 3/1957 | ............ F16H 48/08 |
| JP | 2007285342 A1 | 11/2007 | |

\* cited by examiner

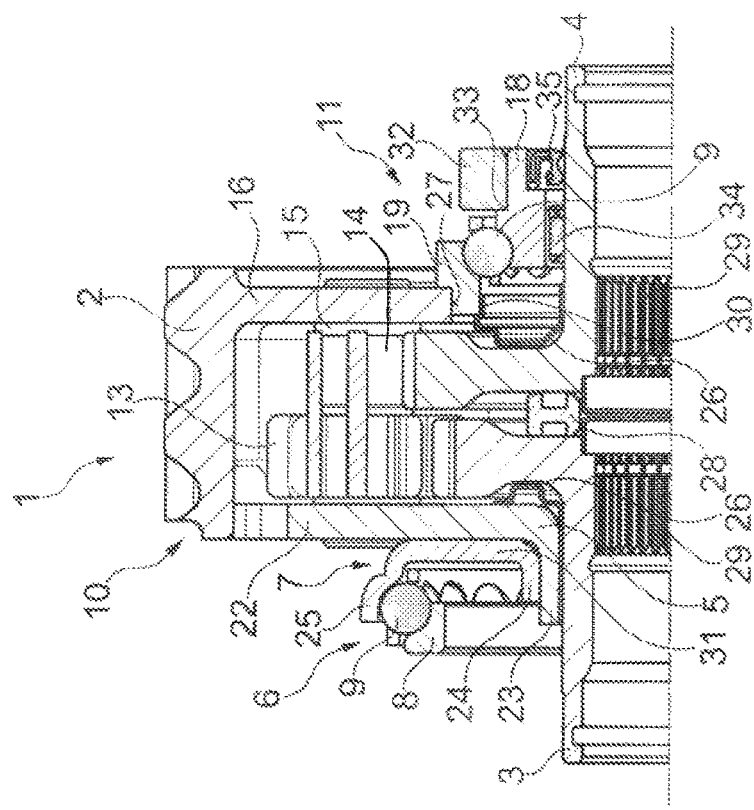
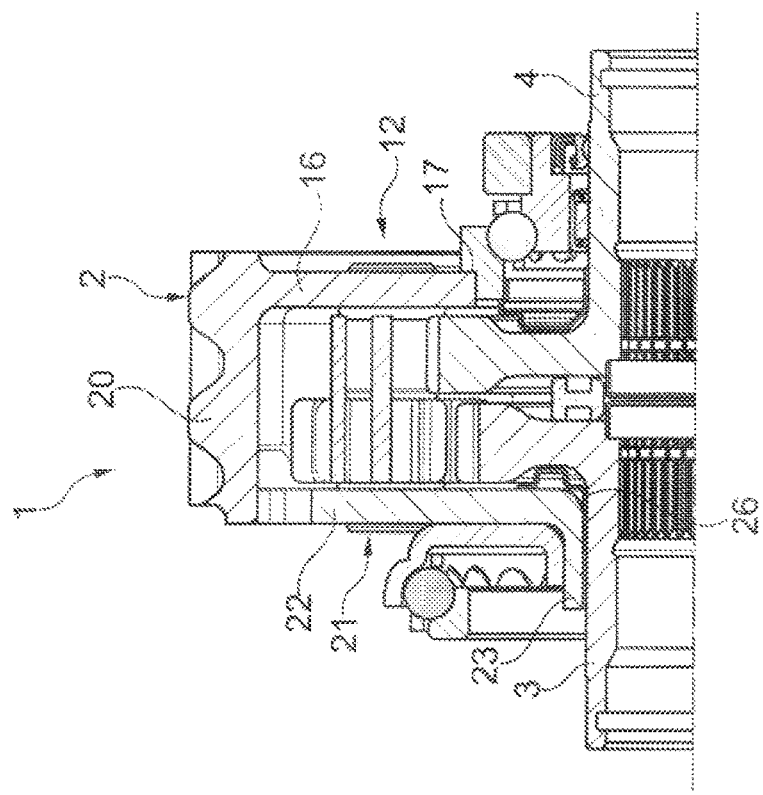
Fig. 1a
Fig. 1b

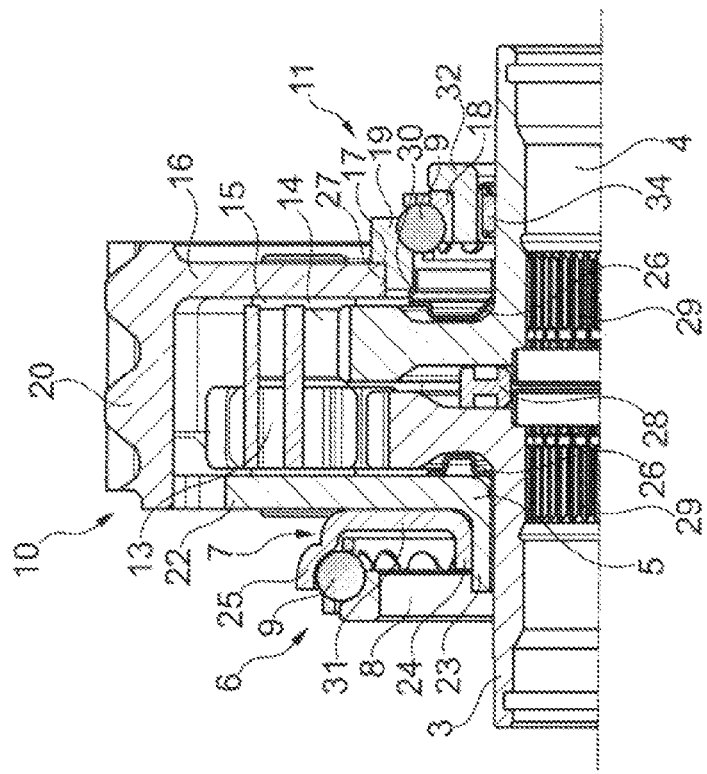
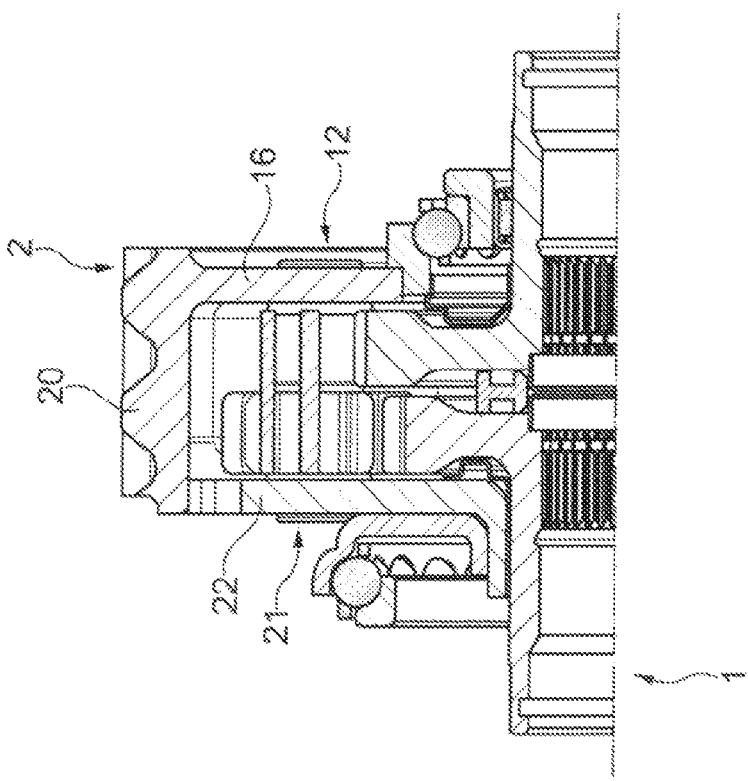
Fig. 2a
Fig. 2b

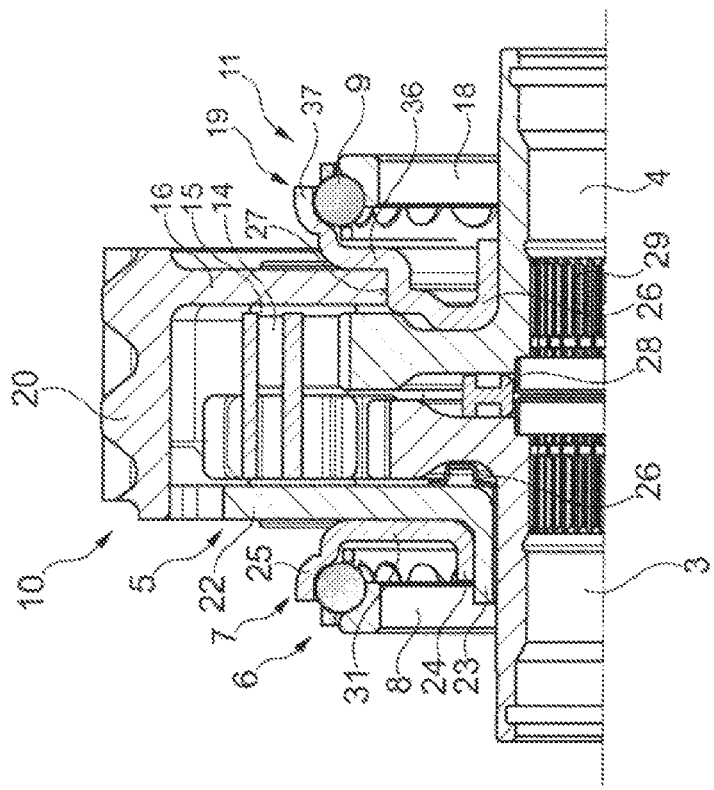
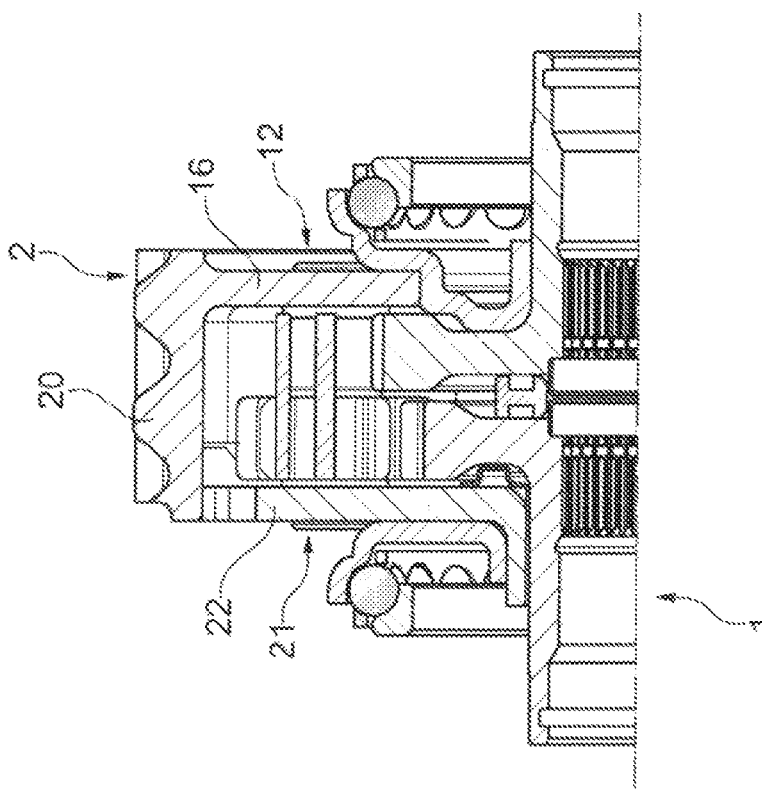

SUPPORTING ASSEMBLY FOR A LIGHTWEIGHT DIFFERENTIAL

CROSS-REFERENCE TO RELATED APPLICATIONS

The present application is the United States National Stage Application pursuant to 35 U.S.C. § 371 of International Patent Application No. PCT/DE2014/200554, filed Oct. 14, 2014, and claims priority to German Patent Application No. 10 2013 222 621.7, filed Nov. 7, 2013, which applications are incorporated by reference in their entireties.

FIELD

The present disclosure relates to a differential transmission for a motor vehicle, the differential transmission comprising a driving gear, by means of which the torque can be introduced into the transmission; comprising a first output member and a second output member, by means of which the torque can be outputted from the transmission; and comprising a differential housing, which is attached to the driving gear in a rotationally fixed manner, wherein the driving gear forms with the differential housing a differential cage for transmitting the torque from the driving gear to the first output member, wherein the first output member is arranged in such a way that the first output member can be rotated in relation to the differential cage; and comprising a first rolling bearing for supporting the differential housing on a housing for the purpose of attaching to a motor vehicle.

BACKGROUND

German publication no. DE 10 2012 206 443 A1 (Biermann et al.) discloses a planetary gear differential transmission for a motor vehicle, the planetary gear differential transmission comprising a driving gear, by means of which the torque can be introduced into the transmission; comprising a first output member and a second output member, by means of which the torque can be outputted from the transmission; comprising a differential cage, which is designed to transmit the torque from the driving gear to the first output member, wherein the differential cage is attached to the driving gear in a rotationally fixed manner; and the first output member is arranged in such a way that it can be rotated in relation to the differential cage; and comprising a rolling bearing with a bearing shell, which is attached to the differential cage in a rotationally fixed manner.

For example, DE 10 2011 085 119 B3 (Martini et al.), discloses differential transmissions. Thus, this document discloses a spur gear differential, comprising a planetary gear carrier and two sun gears, which can be rotated relative to the planetary gear carrier, at least one friction disk and at least one spring means, which biases the sun gears relative to the planetary gear carrier. The spring means is spring-mounted, on the one hand, against a sun gear or the planetary gear carrier and, on the other hand, against an axial bearing. The geometrical and functional features, which are disclosed in DE 10 2011 085 119 B3 (Martini et al.), shall be incorporated by reference in its entirety.

SUMMARY

The object of the present disclosure is to design an alternative support for a differential transmission, in particular, a lightweight differential transmission. The differential transmission shall be optimized in terms of the number of its individual parts, weight, stiffness and the amount of installation space that is required. The transmission shall be easy and inexpensive to manufacture and assemble.

The engineering object is achieved in a device that conforms to its genre, in that a bearing shell of a second rolling bearing is attached directly to the driving gear in a rotationally fixed manner. This bearing shell is preferably the outer ring of the second rolling bearing. As an alternative, the bearing shell may be the inner ring of the second rolling bearing. Since the bearing shell is attached directly to the driving gear, the bearing arrangement is stiffer than the known bearing arrangements, in which a driving gear is mounted with the interposition of a differential housing or differential cage.

Advantageous embodiments are claimed in the dependent claims and will be explained in greater detail below.

The driving gear can form in an advantageous way a part of the differential cage, an arrangement that was achieved in the known differentials by providing the differential housing. In other words, a part of the differential cage may be constructed as one piece or integrally with the driving gear. As a result, the differential housing may be built smaller and lighter.

The driving gear may be designed as a driving gearwheel. The first output member and/or the second output member respectively may be designed as the output gearwheels.

In one embodiment the driving gear may be designed with a receptacle for receiving or supporting at least one component, supporting a pinion gear. The pinion gear may be received or mounted in an advantageous way directly in the driving gear. The pinion gear may be designed, in particular, as a pinion gearwheel.

The differential transmission may be designed, in particular, as a planetary gear differential transmission, a bevel gear differential transmission or a spur gear differential transmission. In the case of a planetary differential transmission, the driving gear and the differential housing form a planet carrier. The first drive member forms a first sun gear, in particular, a first sun gearwheel; and the second drive member forms a second sun gear, in particular, a second sun gearwheel; and the pinion gear forms a planet gear, in particular, a planet gearwheel.

According to one embodiment, the driving gear may comprise a flange section, which extends more or less radially inwards. This flange section is designed preferably as a circumferential web, in particular, preferably as a continuous circumferential web. The receptacle for the pinion gear can be arranged in this flange section or circumferential web; and in this way the pinion gear may be attached directly to the driving gear. As a result, the bearing arrangement of the pinion gear relative to the driving gear may be designed to be very stiff and precise in an advantageous manner. The flange section or the circumferential web may be formed in an advantageous manner, in particular, in a lateral edge section of the driving gear, when viewed in the axial direction.

The receptacle may be formed preferably as a hole or bore, in particular, as a through-hole or blind hole or as a through-bore or blind bore. Furthermore, the component, supporting the pinion gear, may be designed as a bolt, a pin or a sleeve.

In one embodiment the first and second rolling bearings are arranged in an O-type arrangement. In this way the supporting width of the bearing arrangement may be greater than the actual distance between the bearings. The first rolling bearing and/or the second roller bearing is or are preferably single rowed. The rolling bodies between the outer ring and the inner ring are preferably spherical. In addition, rolling bodies, such as barrels, needles or cylinders, may be used.

The first rolling bearing may have an outer ring and an inner ring, between which the rolling bodies are disposed. The first rolling bearing supports the differential housing and, in so doing, the differential transmission relative to a housing or a flange or a similar structure for the purpose of attaching the differential to a motor vehicle. In one embodiment the outer ring is attached to the differential housing in a rotationally fixed manner; and the inner ring is attached to the housing in a rotationally fixed manner. In an alternative embodiment the inner ring is attached to the differential housing in a rotationally fixed manner; and the outer ring is attached to the housing in a rotationally fixed manner.

The second rolling bearing, supporting the driving gear, has the bearing shell, which may be a bearing ring, in particular, an inner ring or an outer ring. The second rolling bearing supports the driving gear directly and, in so doing, the differential transmission relative to a housing or a flange or a similar structure for the purpose of attaching the differential to a motor vehicle. In one embodiment the outer ring is attached to the driving gear in a rotationally fixed manner; and the inner ring is attached to the housing in a rotationally fixed manner. In an alternative embodiment the inner ring is attached to the driving gear in a rotationally fixed manner; and the outer ring is attached to the housing in a rotationally fixed manner. The bearing shell is supported preferably over the entire periphery of the driving gear, in particular, over the entire periphery of the radial flange section or the circumferential web.

The inner ring and the outer ring of the first rolling bearing and the second rolling bearing respectively are referred to as the bearing shell or the bearing ring in this description for the sake of simplicity.

According to an additional embodiment, a bearing shell of the first rolling bearing and/or the second rolling bearing is a solid component, which is made preferably by means of a metal cutting process or an extrusion process. The sheet metal thickness of the starting material of the bearing shell is preferably not less than approximately 20% to approximately 30%, preferably not less than approximately 25% of the diameter of the rolling body. This thickness is particularly advantageous for a suitable stiffness of the bearing. If both bearing shells, i.e., the inner ring and the outer ring, are designed as a sheet metal component, then the bearing shells or more specifically the blanks, which are used to produce them, exhibit the same sheet metal thickness.

As an alternative, the bearing shell may have a solid bearing ring, which is produced, for example, by a metal cutting process.

In all of the embodiments the material of the bearing shell may be a hardened steel, in particular, 16MnCr5.

Preferably, the bearing shell is or all of the bearing shells are at least partially hardened, in particular, in the area of the raceway of the rolling bodies. The bearing shells may be hardened throughout. A hardness penetration depth in a range of approximately 0.5 mm to approximately 0.8 mm, preferably, approximately 0.5 mm is preferred. These figures relate, in particular, to the hardness penetration depth after the raceway has been finish machined.

According to one example embodiment, the raceway of the second rolling bearing, supporting the driving gear, is situated radially inside the flange section or more specifically inside the circumferential web. This design ensures that the bearing arrangement will be easy to assemble.

According to an additional embodiment, the inner bearing shell of the second rolling bearing is attached or fixed to or in a housing or to a similar structure for purposes of attaching the differential to a motor vehicle, for example to or in a flange or in an opening or bore. The bearing shell can be pressed into or onto the flange or opening or bore. In particular, the bearing shell may have an offset, which is used to axially support and/or position with respect to the housing.

In a particular embodiment of the second rolling bearing, its outer ring is a sheet metal component, as described above. This outer ring is attached by means of a press fit to or into the driving gear. The inner ring of the second rolling bearing is designed to be solid, in particular, is produced by machining. The raceway of the second rolling bearing extends preferably axially adjacent to and radially approximately at the level of the inside diameter of the driving gear, in particular, at the level of the inside diameter of its flange section or more specifically its circumferential web. The support structure for supporting the output member is formed in one piece or integrally with the outer ring. The support structure has preferably the same thickness as the outer ring. In this embodiment the outer ring is used to radially and axially support and mount the output member. It is particularly advantageous if the outer ring is provided with openings in the region of an axial stop for the output member, an arrangement that results in a reduction of the weight.

In order to mount an output member, it is possible to use an additional pilot bearing in one embodiment. This pilot bearing is positioned in the bearing shell or in the housing or the flange for purposes of attaching the differential to a motor vehicle. The pilot bearing may be pressed, in particular, into the bearing shell of the second rolling bearing and/or the first rolling bearing, in particular, into the inner ring. The pilot bearing is designed preferably as a needle bearing. It is especially advantageous, if a raceway of the pilot bearing is formed by means of the bearing shell of the first and/or second rolling bearing. In other words, the rolling bodies of the pilot bearing roll on the bearing shell. The result is a small number of interacting components and a reduction in weight.

According to one example embodiment, the driving gear is attached to the bearing shell, in particular, is pressed onto or into the bearing shell, in a form fitting or force fitting manner. In this way the driving gear and the bearing shell can be easily and precisely positioned and fixed relative to each other in the axial and radial direction. The bearing shell may have an offset, a step or a shoulder, which serves as an (additional) axial support of the driving gear or as an axial stop for the driving gear. The shoulder may be produced by cold forming or by mechanical treatment or by finish machining.

In one embodiment a support structure for at least one of the drive members is attached to the bearing shell, in particular, is pressed into the bearing shell or is pressed onto the bearing shell in a force fitting manner. It is especially advantageous, if the support structure can be pressed into the outer ring of the first and second rolling bearing respectively. In addition, support structure can be pressed in, in particular, firmly pressed in, on an inside edge or on the inner periphery of an opening, which receives the bearing shell, in particular, the outer ring, and which is a part of the differential cage or more specifically the driving gear. The support structure can be used to support the output member in the radial and/or axial direction.

The support structure is shaped preferably in the manner of a cup and may be referred to, may be designed and may act as a bearing structure, a bearing cup, a support sleeve or a sliding sleeve. The support structure is supported radially and/or axially, so that its position is defined relative to the driving gear or the differential housing respectively. This support of the support structure can be provided, in particular, by means of an offset or a shoulder. The support structure is attached in such a way that its position relative to the differential cage or more specifically the output member is stable, an arrangement that has the effect of reducing play and backlash. As a result, it is possible to dispense with the mechanical treatment of the unit, supporting the support structure (bearing shell, inner ring, outer ring, differential housing, driving gear) in an advantageous way by providing the shoulder or more specifically the offset.

The support structure is manufactured preferably without machining. It may be, in particular, a sheet metal component, which is produced by means of cold forming, for example, deep drawing and/or stamping. Then the support structure is particularly inexpensive and lightweight. As an alternative, the support structure may be produced by molding methods and/or optionally may be mechanically finish machined.

The support structure is made preferably of a thin sheet metal material having a sheet metal thickness of preferably not more than approximately 1 mm to approximately 2 mm, in particular, preferably approximately 1.5 mm. It is advantageous if the support structure has a sheet metal thickness that is less than that of the starting material of the differential cage or more specifically the bearing rings (outer ring and/or inner ring), as a result of which it is possible to reduce the weight and the amount of material that is consumed. The sheet metal thickness of the support structure is preferably at most approximately 25% to 35% and, in particular, preferably at most approximately 30% of the thickness of the starting material of the differential cage or more specifically the bearing rings. According to one example embodiment, the sheet metal thickness is preferably at most approximately 25% to 35% and, in particular, preferably approximately 30% of the thickness of the differential cage or more specifically the bearing rings. The net result is a sufficiently high stability at a low weight.

According to a particularly advantageous embodiment, the support structure for a drive member is formed integrally with the bearing shell. In other words, the support structure is constructed in one piece with the bearing shell. These variants are particularly easy to produce and simple to assemble.

According to one embodiment, the driving gear and the differential housing are riveted together. For this purpose the holes or bores for receiving the rivets may be formed in the driving gear, in particular, in its radially inwards extending flange section or circumferential web. It is particularly advantageous, if the flange section or the circumferential web has at least in sections in the axial direction a thickening or a plurality of thickenings, into which the hole or the bore for receiving the rivets may be introduced. It is particularly advantageous, if the differential housing can be axially supported on the thickening or the thickenings in the axial direction, so that it is possible to design a differential cage that is very stable, yet easy to build and simple to assemble.

Hence, it is possible to design the differential housing very advantageously as a flat component, in particular, as a sheet metal component of relatively simple geometry.

According to one embodiment, the driving gear and the differential housing may be attached to each other by means of a frictional connection. In particular, the differential housing can be pressed into the driving gear.

Preferably, a shaft sealing ring or a similar seal seals between the first or the second bearing, on the one hand, and the output member, on the other hand. The shaft sealing ring can be disposed and attached in the support structure or in the inner ring of the bearing. As a result, a very simple and effective sealing of the bearing opening is achieved.

DESCRIPTION OF THE DRAWINGS

Various embodiments are explained in greater detail below with reference to the drawings. The drawings show the following, in which:

FIG. 1a is a longitudinal view of a first embodiment of a differential transmission;

FIG. 1b is a longitudinal view of a first embodiment of a differential transmission;

FIG. 2a is a longitudinal view of a second embodiment of a differential transmission;

FIG. 2b is a longitudinal view of a second embodiment of a differential transmission;

FIG. 3a is a longitudinal view of a third embodiment of a differential transmission; and, FIG. 3b is a longitudinal view of a third embodiment of a differential transmission.

The figures are merely schematic in nature and serve only to elucidate the various embodiments. Identical elements are denoted by the same reference numerals. Details of the various embodiments may be combined.

DETAILED DESCRIPTION

FIGS. 1a and 1b show inventive differential transmission 1 for a motor vehicle in a first embodiment. FIG. 2 shows a second embodiment; and FIGS. 3a and 3b show a third embodiment. The three embodiments are described in such a way that the same or equivalent details are described with reference to FIGS. 1a and 1b. Differing details are described with reference to the respective figure.

Differential transmission 1 includes driving gear 2, output member in the form of sun gear 3, output member in the form of sun gear 4, differential housing 5 and several pairs of planet gears 13 and 14. Driving gear 2 and differential housing 5 are coupled to each other by means of riveted joints, which are not shown in the figures, in such a way that the driving gear and the differential housing are secured against rotation. The driving gear and the differential housing form together differential cage 10, which forms a planet carrier.

Driving gear 2 has outer circumferential gear rim 20 and radially inwards adjoining flange section 16. Flange section 16 has bores 12, each of which forms a receptacle for bolt 15. Differential housing 5 also has bores 21, each of which forms a receptacle for corresponding bolt 15. In other words, bolt 15 is received on one side in bore 12 of driving gear 2 and on the opposite side in bore 21 of differential housing 5.

Differential cage 10, composed of driving gear 2 and differential housing 5, is mounted by means of rolling bearing 6 and rolling bearing 11.

Rolling bearing 6 is used to mount differential housing 5 on an attachment (not shown in the figures) to a motor vehicle, for example, to a housing or a flange. Rolling bearing 11 is used to mount driving gear 2 on an attachment to a motor vehicle, for example, to a housing or a flange. Rolling bearing 6 and rolling bearing 11 are placed in an O-type arrangement and are designed in each instance as angular contact ball bearings with rolling bodies 9.

In contrast to planet gear 13, planet gear 14 has a longer axial length. The axial length is measured along the axis of rotation of differential transmission 1. In the figures only planet gear 13 of planet gears 13 and 14 of differential transmission 1 is shown in its entirety; of planet gear 14, only a part of the teeth can be seen, because the teeth are covered for the most part by planet gear 13. Sun gear 3 meshes with planet gear 13; and other sun gear 4 meshes with planet gear 14. Planet gears 13 and 14 of pair of planet gears also mesh with each other.

Planet gear 13 is mounted on bolt 15. Bolt 15 is disposed in sleeves (not shown in the figures), which are hardened, in particular, fully hardened, in driving gear 2 or more specifically in differential housing 5. The sleeves have radially projecting flanges, which rest against planet gear 13 and determine its axial position. Planet gear 14 may be mounted accordingly.

The two sun gears 3 and 4 have internal tooth system 29, by means of which the torque can be transmitted on transmitting elements, which are not shown in the figures, to the wheels of a motor vehicle. Friction disk (friction ring) 28 is disposed between the two sun gears 3 and 4.

It should be noted that the tip circle diameters of the two sun gears 3 and 4 are different. In this case the tip circle diameter of large sun gear 4 is larger than the root circle diameter of small sun gear 3. Large sun gear 4 is approximately 20% larger than small sun gear 3. In traction mode, the smaller planet gear of pair of planet gears 13, 14 runs ahead of the large planet gear. The solution reduces the noise emission. Any problems arising with respect to the support width are also reduced. Even limited slip values of up to 30% can be achieved without any major problems. In this way it is possible to generate a so-called Torsen differential.

In the exemplary embodiment that is shown, differential housing 5 is a sheet metal component. The differential housing has a shape that is more or less L shaped in the cross section. Furthermore, the differential housing has leg 22 extending in the radial direction and leg 23 extending in the axial direction. Differential housing 5, which is designed as a sheet metal component in the exemplary embodiments shown here, may also be made as a cast or forged part.

Rolling bearing 6 comprises inner ring 8 and outer ring 7, between which rolling bodies 9 roll.

Outer ring 7 is a sheet metal component, which is produced by means of cold forming, and is disposed on differential housing 5 in a rotationally fixed manner. Outer ring 7 has base section 31, which extends in the radial direction, rests against leg 23 and supports this leg in the radial direction. At base section 31, arm 24 is arranged radially inwards; and arm 25 is arranged radially outwards. Arm 25 extends in the axial direction, rests against leg 22 of differential housing 5, and supports the leg in the radial direction. Arm 25 extends more or less in the axial direction and forms a raceway for rolling bodies 9.

Inner ring 8 is a solid bearing ring and also forms a bearing surface for rolling bodies 9.

Rolling bearing 11 has bearing shell 18 as inner ring 18 and bearing shell 19 as outer ring 19, between which rolling bodies 9 roll.

In the embodiments of FIGS. 1a and 1b and FIGS. 2a and 2b, outer ring 19 is a solid bearing ring, which is produced by machining. The outer ring has externally offset 17. Outer ring 19 is attached directly to driving gear 2, and specifically to inside edge 27 of flange section 16. It is held, in particular, is pressed in, in a force fitting manner. Offset 17 enables an axial guide and alignment of driving gear 2. At the inside diameter of outer ring 19 support structure 26 for sun gear 4 is arranged and supported in the radial and axial direction. This arrangement is achieved by means of offset 30. Support structure 26 supports sun gear 4 in both the axial direction and the radial direction. In the embodiments shown in FIGS. 1a through 2b, support sleeve 26 is a sheet metal component and has a wall of constant thickness.

In the embodiment according to FIGS. 1a and 1b, inner ring 18 is a solid bearing ring, which is produced by machining. The inner ring is pressed into flange 32 of a housing for the purpose of attaching to a motor vehicle and has on its outer periphery offset 33, which serves an axial alignment. Pilot bearing 34 is incorporated into the inner periphery of inner ring 18, for additional support of sun gear 4, where in this case the outer raceway of pilot bearing 34 is formed by the inner periphery of inner ring 18. In addition, shaft sealing ring 35 is also pressed into inner ring 18.

In the embodiment according to FIGS. 2a and 2b, inner ring 18 is pressed onto flange 32 of a housing for the purpose of attaching to a motor vehicle. Pilot bearing 34 is pressed into flange 32 for additional support of sun gear 4.

In the embodiment according to FIGS. 3a and 3b, outer ring 19 of rolling bearing 11 is a sheet metal component, which is produced by cold forming. Outer ring 19 is pressed into circumferential inside edge 27 of flange area 16 of driving gear 2 in a rotationally fixed manner and is positioned above it in the axial direction. The outer ring rests together with a top surface of base section 36 against flange section 16 in the axial direction, with the effect that the outer ring is positioned in the axial direction. Inner ring 18 of rolling bearing 11 is designed as a solid bearing ring.

Outer ring 19 is constructed in one piece with support sleeve 26. Base section 36, which extends in the radial direction, is followed radially inwards by integral support sleeve 26, which is formed essentially in the shape of a U, and which is used to support sun gear 4 in the radial and axial direction. Arm 37 extends radially outwards from base section 36; and the arm forms an outer raceway for rolling bodies 9 of rolling bearing 11.

In all of the embodiments the surface of support sleeves 26 that faces sun gear 3 and 4, respectively, forms a bearing surface, on which respective sun gear 3, 4 is slidably mounted and relative to which the respective sun gear rotates.

LIST OF REFERENCE NUMERALS 1 differential transmission
2 driving gear
3 output member, sun gear
4 output member, sun gear
5 differential housing
6 first rolling bearing
7 outer ring
8 inner ring
9 rolling body
10 differential cage
11 second rolling bearing
12 receptacle
13 first planet gear
14 second planet gear
15 component, bolt
16 flange section
17 offset
18 bearing shell, inner ring
19 bearing shell, outer ring 20 gear rim
21 bore
22 leg
23 leg
24 arm
25 arm
26 support structure, support sleeve
27 inside edge
28 friction disk
29 internal teeth
30 offset
31 base section
32 flange
33 offset
34 pilot bearing
35 shaft sealing ring
36 base section
37 arm

What is claimed is:

1. A differential transmission for a motor vehicle, comprising:
a driving gear operatively arranged to introduce torque into the differential transmission;
a first output member;
a second output member;
a differential housing non-rotatably connected to the driving gear, the differential housing and the driving gear forming a differential cage operatively arranged to:
transmit torque from the driving gear to the first output member; and,
rotate with respect to the first output member;
a first rolling bearing for supporting the differential housing; and,
a second rolling bearing including an outer ring, the driving gear non-rotatably connected to the outer ring.

2. The differential transmission recited in claim 1, wherein the driving gear is designed with a receptacle for receiving at least one component arranged to support a pinion gear.

3. The differential transmission recited in claim 2, wherein the receptacle is disposed in a radially inward extending flange section.

4. The differential transmission recited in claim 2, wherein the receptacle comprises a hole.

5. The differential transmission recited in claim 2, wherein the at least one component comprises a bolt, a pin, or a sleeve.

6. The differential transmission recited in claim 1, wherein outer ring is non-rotatably connected to the driving gear in a force fitting manner.

7. The differential transmission recited in claim 1, wherein the driving gear is pressed onto or into the outer ring in a force fitting manner.

8. The differential transmission recited in claim 1, wherein the outer ring is a solid component, which is produced by machining or extrusion.

9. The differential transmission recited in claim 1, wherein a support structure for the second output member is attached to the outer ring.

10. The differential transmission recited in claim 9, wherein the support structure for the second output member is pressed into or onto the outer ring.

11. The differential transmission recited in claim 1, wherein a support structure for the second output member is integrally formed with the outer ring.

12. The differential transmission recited in claim 1, wherein the differential transmission is designed as a planetary gear differential transmission.

13. The differential transmission recited in claim 1, wherein the differential transmission is designed as a spur gear differential transmission.

14. A differential transmission for a motor vehicle, comprising:
a driving gear operatively arranged to introduce torque into the differential transmission;
a first output member;
a second output member;
a differential housing non-rotatably connected to the driving gear, the differential housing and the driving gear forming a differential cage operatively arranged to:
transmit torque from the driving gear to the first output member; and,
rotate with respect to the first output member;
a first rolling bearing for supporting the differential housing;
a second rolling bearing including a bearing shell, the bearing shell non-rotatably connected to the driving gear; and,
a support structure for the second output member connected to the bearing shell.

15. The differential transmission recited in claim 14, wherein the support structure for the second output member is pressed into or onto the bearing shell.

16. A differential transmission for a motor vehicle, comprising:
a driving gear operatively arranged to introduce torque into the differential transmission;
a first output member;
a second output member;
a differential housing non-rotatably connected to the driving gear, the differential housing and the driving gear forming a differential cage operatively arranged to:
transmit torque from the driving gear to the first output member; and,
rotate with respect to the first output member;
a first rolling bearing for supporting the differential housing;
a second rolling bearing including a bearing shell, the bearing shell non-rotatably connected to the driving gear; and,
a support structure for the second output member integrally formed with the bearing shell.

* * * * *